United States Patent
Kim et al.

(10) Patent No.: US 9,848,001 B2
(45) Date of Patent: *Dec. 19, 2017

(54) SECURE ACCESS TO MOBILE APPLICATIONS

(71) Applicant: MOBILE IRON, INC., Mountain View, CA (US)

(72) Inventors: Mansu Kim, Cupertino, CA (US); Joshua Sirota, Los Altos, CA (US); Suresh Kumar Batchu, Milpitas, CA (US)

(73) Assignee: MOBILE IRON, INC., Mountain View, CA (US)

(*) Notice: Subject to any disclaimer, the term of this patent is extended or adjusted under 35 U.S.C. 154(b) by 126 days.

This patent is subject to a terminal disclaimer.

(21) Appl. No.: 14/929,103

(22) Filed: Oct. 30, 2015

(65) Prior Publication Data

US 2016/0057153 A1 Feb. 25, 2016

Related U.S. Application Data

(63) Continuation of application No. 14/137,752, filed on Dec. 20, 2013, now Pat. No. 9,210,170.

(60) Provisional application No. 61/745,350, filed on Dec. 21, 2012.

(51) Int. Cl.
*G06F 7/04* (2006.01)
*H04L 29/06* (2006.01)
*H04W 12/06* (2009.01)

(52) U.S. Cl.
CPC ............ *H04L 63/102* (2013.01); *H04L 63/10* (2013.01); *H04L 63/108* (2013.01); *H04W 12/06* (2013.01)

(58) Field of Classification Search
CPC ..... H04L 63/08; G06F 21/10; G06F 21/6218; G11B 20/00086
See application file for complete search history.

(56) References Cited

U.S. PATENT DOCUMENTS

| | | | |
|---|---|---|---|
| 8,639,685 B2* | 1/2014 | Huang | G06F 17/30554 705/35 |
| 2009/0328186 A1* | 12/2009 | Pollutro | G06F 21/31 726/13 |
| 2010/0242097 A1* | 9/2010 | Hotes | G06F 9/468 726/4 |
| 2010/0299152 A1* | 11/2010 | Batchu | H04M 3/4234 705/1.1 |
| 2014/0082706 A1* | 3/2014 | Banford | H04L 67/145 726/5 |

* cited by examiner

*Primary Examiner* — Ali Abyaneh
(74) *Attorney, Agent, or Firm* — Van Pelt, Yi & James LLP

(57) ABSTRACT

Securing access to one or more applications in an enterprise zone (e.g., a set of protected applications) is disclosed. A last activity time associated with a use of at least one mobile application in the protected subset may be retrieved from a shared storage location associated with a protected subset of two or more protected mobile applications. It may be determined that the last activity time is within a session expiration time period associated with the protected subset. Access to one or more applications in the protected subset may be allowed without credential verification based at least in part on the determination.

20 Claims, 6 Drawing Sheets

SECURE ACCESS TO MOBILE APPLICATIONS

CROSS REFERENCE TO OTHER APPLICATIONS

This application is a continuation of co-pending U.S. patent application Ser. No. 14/137,752, entitled SECURE ACCESS TO MOBILE APPLICATIONS filed Dec. 20, 2013 which is incorporated herein by reference for all purposes, which claims priority to U.S. Provisional Application No. 61/745,350, entitled ENTERPRISE ZONE filed Dec. 21, 2012 which is incorporated herein by reference for all purposes.

BACKGROUND OF THE INVENTION

Mobile devices (e.g., smartphones, tablets, etc.) often serve multiple purposes. A single mobile device may be used for work-related tasks, personal uses, and/or other purposes. For example, mobile devices often include enterprise applications (e.g., enterprise resource planning (ERP), customer relationship management (CRM), work email, and/or other applications), personal applications (e.g., games, social networking applications, personal email, and/or other applications), and/or other applications. Varying levels of security may be required for different categories of applications (e.g., personal applications, enterprise applications, etc.).

BRIEF DESCRIPTION OF THE DRAWINGS

Various embodiments of the invention are disclosed in the following detailed description and the accompanying drawings.

DETAILED DESCRIPTION

Figure 1:
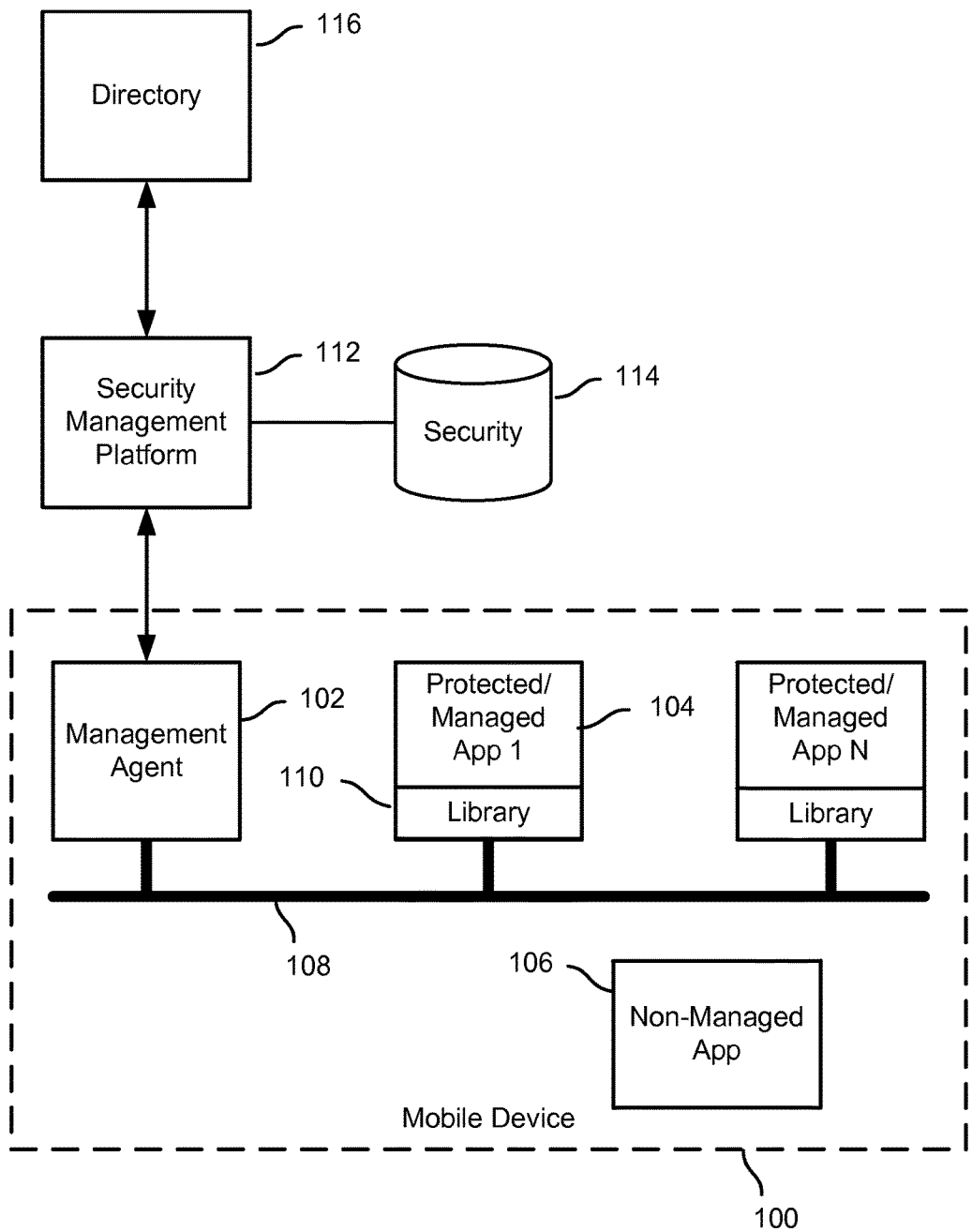
FIG. 1 is a block diagram illustrating embodiments of a system including an enterprise application zone.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Securing access to one or more applications in an enterprise zone (e.g., a set of protected applications) is disclosed. In some embodiments, a single sign-on environment to be provided for a set of managed applications on a device. The techniques disclosed herein in various embodiments may be used to provide secure access (e.g., passcode protected access) to one set of mobile applications (e.g., enterprise applications) while not restricting access to other applications (e.g., personal applications) on a mobile device.

According to various embodiments, a last activity time associated with a use of at least one mobile application in a protected subset of two or more protected mobile applications may be retrieved. The last activity time may, for example, be retrieved from a shared storage location associated with the protected subset. It may be determined that the last activity time is within a session expiration time period associated with the protected subset. Access may be allowed to one or more applications in the protected subset without a credential challenge based at least in part on the determination.

FIG. 1 is a block diagram illustrating embodiments of a system including an enterprise application zone. In the example shown, a mobile device 100 (e.g., smartphone, tablet, etc.) includes a management agent 102 (e.g., a mobile device management (MDM) agent, a trusted management agent, trust client app), protected application(s) 104 (e.g., managed client application(s), managed application(s)), unprotected application(s) 106 (e.g., non-authorized application(s), untrusted application(s), unprotected application(s)), and/or other applications. In some embodiments, the unprotected applications 106 may include a user's personal applications (e.g., personal games, personal cloud file share applications, social networking applications, personal email applications). The protected applications 104 may include enterprise applications (e.g., applications used for work, applications provided by the enterprise). In some embodiments, a device 100 may include protected subsets of protected applications 106 and each set may include an enterprise zone. Each set (e.g., enterprise zone) may be associated with separate access control policies.

In some embodiments, the management agent 102, protected applications 104, and/or other components may be components of, for example, an MDM system. The management agent 102, managed applications 104, and/or other components are configured to share information/data in a trusted manner via a shared storage location 108 (e.g., secure mobile application connection bus, secure inter-application connection bus, secure application command bus, secure application communication bus, etc.). For example, information (e.g., last activity time, session expiration time period(s), protected application access policies, an access state, and/or other information) may be shared in a trusted manner among applications authorized to access the shared storage location 108.

In some embodiments, a library 110 (e.g., a library compiled into the application, wrapped into the application) may be associated with a protected application 104. The library 110 may modify an application's code to behave differently than a corresponding unmodified version of the application behaves. The library 110 may mediate communication between a protected application 104 and the management agent 102 and/or other managed application(s) 104. For example, the library 110 may retrieve information from the shared storage location 108, provide information to the shared storage location 108, and control access to a managed application 104 using the techniques described herein. The library 110 may, for example, reconfigure a managed application 104 to allow the management agent 102 to perform actions on behalf of the managed application 104 including invoking mobile operating system components, using mobile device resources, and accessing/storing application data. The library 110 may, in some embodiments, enforce policies, execute actions, apply configuration changes, and/or perform other operations within the managed application 104. For example, a library 110 may determine whether access should be granted/allowed to the application using the techniques discussed herein. The library 110 may enforce access restriction policies, grant and/or deny access, and/or execute other actions associated with a protected application 104.

According to various embodiments, the management agent 102, managed applications 104, and/or other elements are configured to transfer data in a trusted manner (e.g., securely) via the shared storage location 108. In some embodiments, data may be transferred in a trusted manner among applications authorized to have access to the shared storage location 108 by storing the data in an encrypted form in a shared data storage location (e.g., a pasteboard, shared keychain location, and/or other storage). In various embodiments, data may be transferred in a trusted manner from the management agent 102 to the managed application 104 authorized to have access to the data by calling a uniform resource locator (URL) scheme associated with the managed application 104 and including the encrypted data in the URL call. This URL scheme-based technique may also be used to transfer information from a managed application 104 to the management agent 102 and/or between managed applications 104.

In various embodiments, a security management platform 112 (e.g., a virtual smartphone platform, security management server, etc.) manages configuration(s), polic(ies), and/or settings associated with the mobile device 100. The security management platform 112 may, for example, determine configuration(s), policies, credential information, and/or other information associated with managed applications 104 on the device 100. In various embodiments, the security management platform 112 may determine one or more managed applications included in a set of protected applications 104. In some embodiments, one or more policies associated with a set of managed applications may be determined by the security management platform (e.g., by a user (administrator) of the security management platform 112). For example, policies may include a session expiration period (e.g., a maximum idle time) associated with a set of managed applications 104. Policies may include passcode requirements (e.g., passcode length requirements, complexity requirements, character variety requirements, etc.), credential challenge requirements (e.g., a number of allowed passcode attempts), and/or other policies.

In some embodiments, the security management platform 112 may store various types of information in a security information repository 114. The security information repository 114 may, for example, include information including sets of managed applications, policies, and/or other information. In addition, the security information repository 114 may also include device status information (e.g., jailbreak status, application installation status, security status, etc.). The security information repository 114 may be updated by the security management platform 112 based on information received from the management agent 102 on the device 100.

According to various embodiments, the security management platform 112 may communicate with a directory 116 (e.g., an enterprise directory). The directory 116 may include device user credential information (e.g., user identities, usernames, passwords, passcodes, security questions/answers, etc.) for device 100 users.

In various embodiments, the security management platform 112 may manage (e.g., control, dictate, determine) the configurations, policies, settings, and/or other functional aspects of one or more of the managed applications 104 on the mobile device 100. The security management platform 112 may control aspects of the managed application 104 functionality using the management agent 102 as an intermediary. In various embodiments, identities of protected applications (e.g., application identifiers, Bundle identifiers, protected application URL schemes), security policies (e.g., session expiration periods, etc.), credential challenge policies (e.g., passcode requirements, password requirements, etc.), and/or other information associated with each set of protected applications may be provided (e.g., pushed) to the management agent 102. For example, a mobile device 100 may include multiple sets (e.g., subsets) of protected applications 104 and each set of protected applications may be associated with separate access control policies. In some cases, each set may be associated with a management agent 102; however, in other cases, one management agent may manage access to multiple sets of protected applications. The management agent 102 may pass information to the protected applications 104, implement policies associated with the managed applications 104, and/or perform other operations based on information (e.g., commands) from the security management platform 112. The management agent 102 may implement policies, execute commands, and/or perform other action related to the protected applications by providing information to the secured storage location 108 for retrieval by the library 110 associated with a protected application 104.

Figure 2:
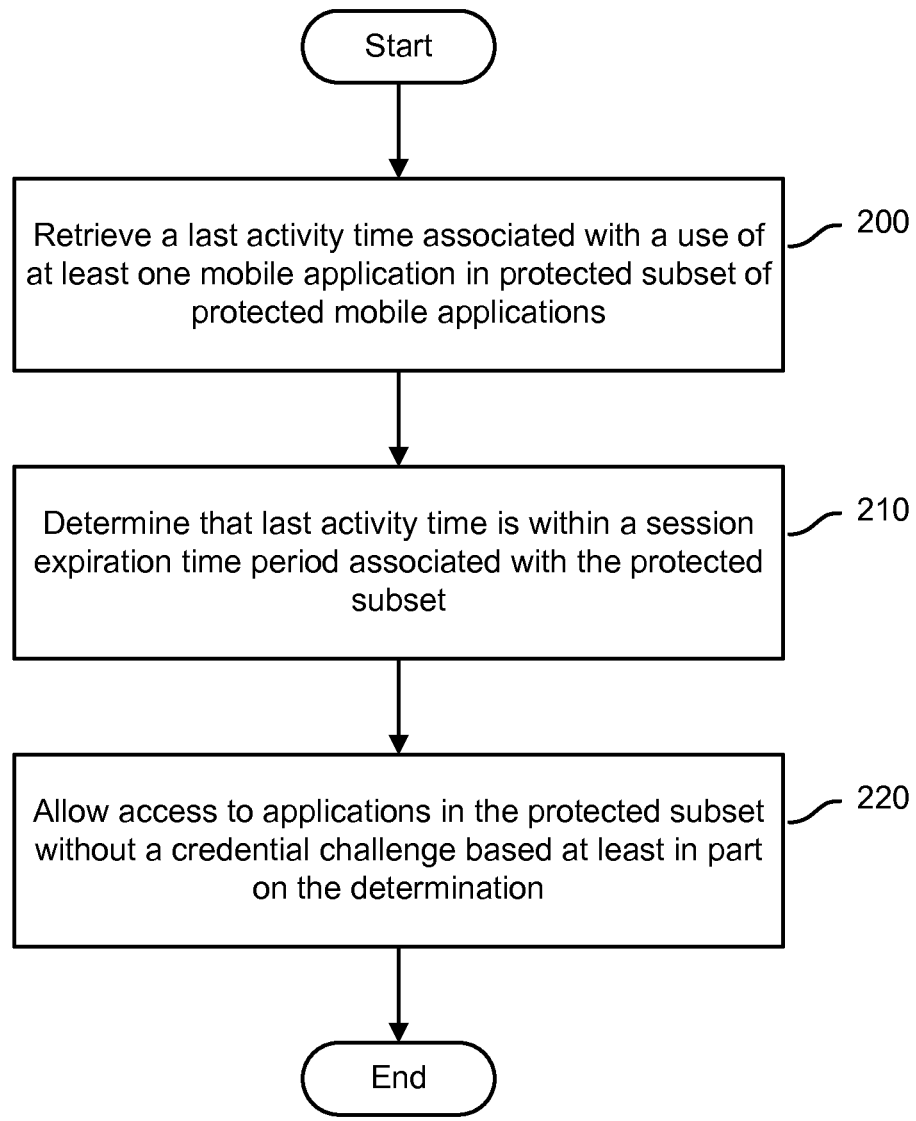
FIG. 2 is a flowchart illustrating embodiments of a process of securing access to protected mobile applications.

FIG. 2 is a flowchart illustrating embodiments of a process of securing access to protected mobile applications. In various embodiments, the process is performed by the system 100 of FIG. 1. At 200, a last activity time associated with a use of at least one mobile application in a protected subset of mobile applications may be retrieved. In some embodiments, the last activity time is retrieved from a shared storage location associated with the set of two or more mobile applications. As discussed above, the shared storage location may include a secure application connection bus (e.g., utilizing a paste board, shared keychain storage, URL scheme encrypted payload transfer mechanism, and/or other techniques). In various embodiments, a protected subset of mobile applications may include a subset (e.g., not all) of the applications included on a mobile device. In some embodiments, the phrases protected set, protected subset, set, subset, and/or other similar terms may be used interchangeably.

In some embodiments, a last activity time may include a most recent time at which at least one application in the protected subset of protected mobile applications was active. A last time an application was active may include, for example, a most recent time at which the application was interacted with (e.g., in use) by a user, in the foreground of the mobile device, closed (e.g., killed, terminated, suspended) by a user, invoked/called by another application (e.g., an application in the protected set of applications), and/or another event associated with the application occurred. According to some embodiments, a last activity time includes a time value stored in the shared storage location that is updated by the one or more applications in a set of protected applications. In some embodiments, a last activity time may be associated with a set of applications, and may include a last time when at least one application in the set was active (e.g., in use, etc.).

According to various embodiments, an application (e.g., a protected application) may provide the shared storage location (e.g., secure application connection bus) an updated last activity time based on the occurrence of certain events. For example, an application may provide the current time (e.g., to the shared storage location) as a last activity time upon the occurrence of an application closing event (e.g., application is closed, killed, terminated, etc.), a background event (e.g., the application is actively ceded to the background), and/or other events. In some embodiments, an application may provide a last activity time to the shared storage location periodically (e.g., at intervals) while the application is in use. In various embodiments, multiple applications in a set of protected applications may update the last activity time stored in the shared storage location. In various embodiments, the last activity may include the last time (e.g., most recent time) that any application (e.g., at least one application) in the set of protected applications was active.

In some embodiments, a user may complete a credential validation operation (e.g., a log in operation, credential challenge) as discussed in detail below, and the last activity time may be updated upon completion of the credential validation. The credential validation operation may be performed in the context of a management agent associated with the set of protected applications. And, credential validation with the management agent may provide a user access to at least one application in a set of managed/protected applications as discussed below.

In some embodiments, if an application is idle (e.g., no input is received), the last activity time may not be updated, and the last activity time (e.g., associated with that application) may remain the last time an interaction occurred with the application.

At 210, it may be determined that the last activity time is within a session expiration time period (e.g., idle timeout period) associated with the subset of protected applications. In some embodiments, a session expiration time period (e.g., session expiration period) may include a period of time (e.g., maximum amount of time) over which the set of applications is permitted to be idle. A session may include a use of an application in the set of protected applications (e.g., by a user), and the session may expire after a period of application inactivity. The session expiration period may be included in a policy applicable to a set of protected applications.

In some embodiments, a session expiration time period may be determined (e.g., designated) by a security management platform, a management agent, an operating system, and/or other element. For example, a security management platform may determine a session expiration period applicable to a set of protected applications. The session expiration period and/or a list of associated protected applications may be provided to a management agent on the device, and the management agent may provide the session expiration period to the shared storage location. In some embodiments, a protected application (e.g., a library associated with a protected application) may retrieve the session expiration period from the shared storage location.

In various embodiments, it may be determined that the last activity time is within a session expiration time period by determining that a difference between a current time and a last activity time is less than and/or equal to the session expiration time period. The current time may be, for example, a time at which a user attempts to activate an application, a time at which an application authorization operation is initiated, a time associated with a clock on the mobile device, and/or other time. A determination that the difference between the current time and the last activity time is less than the session expiration time period may indicate that at least one application in the set of protected applications has been active within a session expiration period associated with the set of protected applications.

At 220, access may be allowed to one or more applications in a protected subset of protected applications without a credential challenge based on the determination. In some embodiments, allowing access (e.g., granting access) to an application may include, for example, allowing an application to be opened, operations associated with the application to be executed, retrieval of information from the application, and/or any other actions associated with the application.

In various embodiments, access may be allowed to one or more applications in the protected set of protected applications. A subset may include one application, all applications in the set, and/or any number of applications in the set of protected applications. In some embodiments, the subset of applications in the set of protected applications may be determined based on one or more parameters (e.g., context, device state, geographic location, time, network connection status, etc.). In one example, access may be allowed to all applications in a (sub)set of protected applications.

In some embodiments, a credential challenge may include a request (e.g., output to user in a dialog) for credentials, passcode, password, bio-metric identification (e.g., fingerprint, retina scan, voice sample, etc.), and/or other credential information. In various embodiments, the credential challenge may be provided by a management agent associated with the protected applications (e.g., managed applications). Techniques for generating and/or outputting a credential challenge are discussed in detail below.

Figure 3:
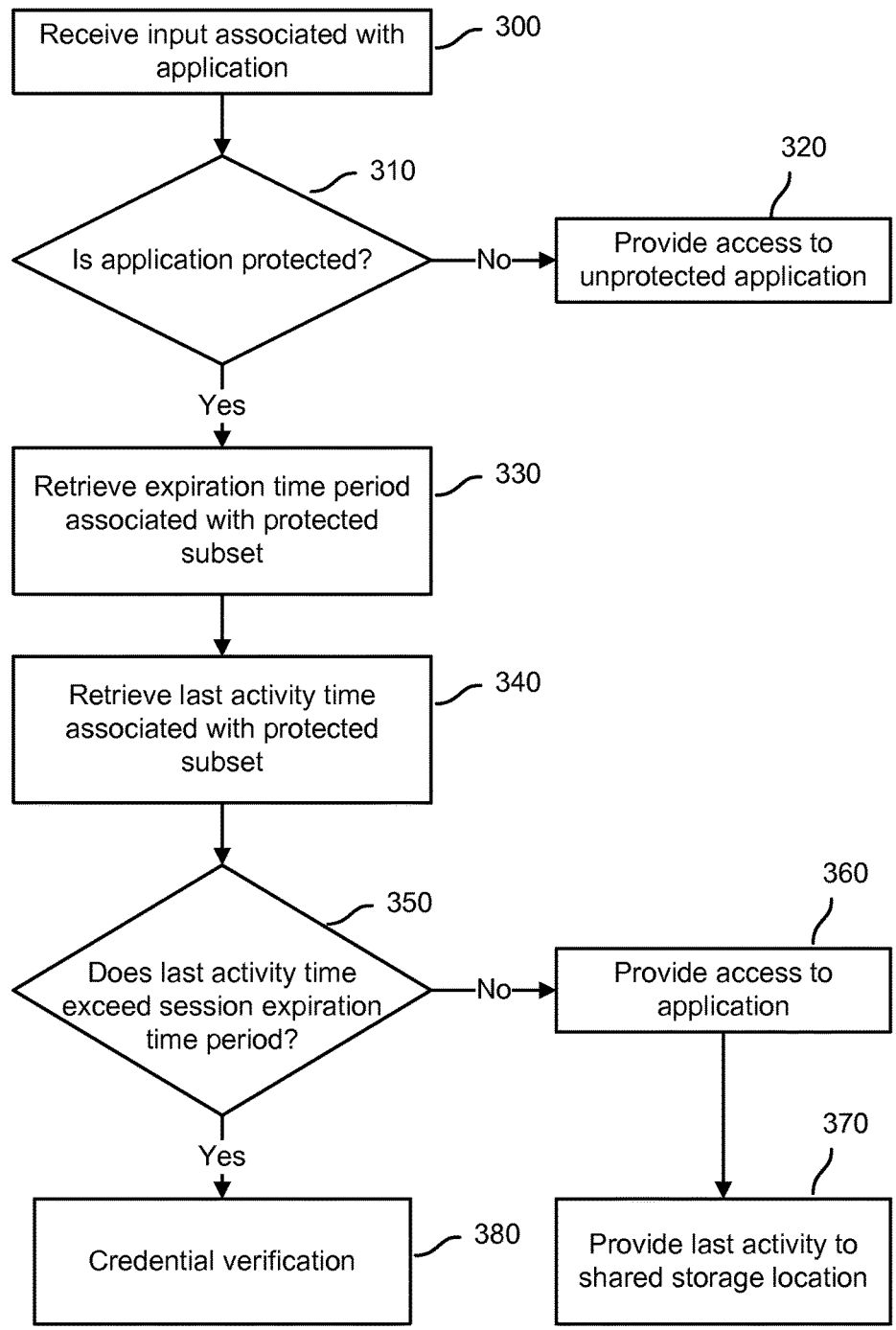
FIG. 3 is a flowchart illustrating embodiments of a process of securing access to protected mobile applications.

FIG. 3 is a flowchart illustrating embodiments of a process of securing access to protected mobile applications. In various embodiments, the process is performed by the system 100 of FIG. 1. At 300, a request to access a mobile application may be received. In some embodiments, a request to access a mobile application may be received when a user clicks on the application, attempts to open the application, and/or otherwise interacts with the application. A request to access a mobile application may include an attempt to invoke (e.g., make a call to) the application (e.g., via a URL scheme call) from another application, operating system, and/or component on the device.

At 310, it may be determined whether the mobile application is associated with a set of protected mobile applications. In various embodiments, a library associated with an application may include information designating that an application is a member of a set of protected applications. It may be determined that an application is associated with a set of protected applications based on a query (e.g., look up) of information in the library associated with the application. For example, a set of mobile applications (e.g., managed applications) may be managed in an MDM framework. The set of mobile applications may be designated (e.g., by a security management platform) for protection using the techniques described herein. In the event it is determined that the application is a protected application, the process may proceed to step 330.

In some embodiments, an unprotected application may not include a library, may not be associated with a management agent (e.g., in an MDM framework), and/or may otherwise be unprotected. For example, an unprotected application may not have any mechanism to trigger the application access-control techniques disclosed herein. In the event an application is determined to be an unprotected application, the process may proceed to step 320.

At 320, access may be provided to an unprotected application. In some embodiments, an application may not include access-control mechanisms as discussed herein and access may be granted to the unprotected application. For example, an unprotected application may be a personal application (e.g., a game, social networking application, personal email, etc.), and a user may be able to access the application without verification, credential challenge, and/or other access-control techniques discussed herein.

At 330, an expiration time period associated with a set of protected applications may be retrieved. In some embodiments, an expiration time period may include a maximum allowable idle period for a set of protected applications. Enforcement of the expiration time period policy may occur at a library associated with a protected application in the set of protected applications. In various embodiments, a library associated with an application (e.g., a protected application) may include instructions to (e.g., be configured to) retrieve an expiration time period from a secure location associated with a set of protected applications of which the application is a member.

According to various embodiments, the expiration time period (e.g., associated with a set of protected applications) may be determined (e.g., defined, assigned, etc.) at a security management platform and may be provided to a management agent on the device. The management agent may transfer the expiration time period to the shared storage location for retrieval by a protected application (e.g., a library associated with a protected application).

At 340, a last activity time associated with the protected applications may be retrieved. In some embodiments, a last activity time may include a last time that at least one application in a set of protected applications (e.g., a protected subset) was active (e.g., in use by a user, etc.). For example, one or more applications (e.g., each application) in a set of applications may update a last activity time upon the occurrence of a triggering event as discussed above. A management agent associated with the protected applications may, in some embodiments, retrieve (e.g., periodically, continuously) last activity times from one or more applications in a set of protected applications. The management agent may, for example, provide (e.g., periodically, continuously) a most recent last activity time to a shared location associated with one or more applications (e.g., each) in a set of protected applications.

In various embodiments, a library associated with a protected application may retrieve the last activity associated with the set of protected applications from a shared storage location.

At 350, it may be determined whether the last activity time exceeds a session expiration time period. In various embodiments, a difference between a current time and a last activity time may be compared to the session expiration time period. For example, the last activity time may exceed the session expiration time period if the difference is greater than and/or equal to the session expiration time period. Conversely, the last activity time may not exceed the session expiration time period if the difference is less than and/or equal to the session expiration time period. As discussed above, the current time may be for example the time at which a user attempts to activate an application, a time at which an application authorization operation is initiated, a time associated with a clock on the mobile device, and/or other time.

A determination that the difference between the current time and the last activity time is less than (e.g., does not exceed) the last activity time period may indicate that at least one application in the set of protected applications has been active within a session expiration period associated with the set of protected applications. In the event the last activity time does not exceed the session expiration time period, the process may proceed to step 360. In the event the last activity time exceeds the session expiration time period, the process may proceed to step 380.

In some embodiments, a protected application and/or set of protected applications may have not been previously used. In this case, it may be determined that no last activity time is associated with the set of applications, and the credentials of the user may be validated (e.g., in step 380).

At 360, access may be provided to the application. In some embodiments, allowing access (e.g., granting access) to an application may include, for example, allowing an application to be opened, operations associated with the application to be executed, retrieval of information from the application, and/or any other actions associated with the application. In various embodiments, access to other applications in the set of protected applications (e.g., the enterprise zone) may be granted.

At 370, a last activity time may be provided to a shared storage location. In some embodiments, an application may provide a last activity time to the shared storage location. For example, a last activity time may be provided to the shared location when an application is opened, when the application is closed (e.g., killed, terminated, etc.), minimized, sent to the background, and/or at other times. In some embodiments, the last activity time may be provided to a shared storage location for retrieval by a management agent. Upon retrieval the management agent may provide the last activity time to one or more applications in a set of protected applications of which the application is a member.

At 380, credentials may be verified. In various embodiments, the library associated with the protected application may determine that the protected applications (e.g., enterprise zone applications) have not been authorized. For example, it may be determined that the set of protected applications (e.g., the enterprise zone) is locked (e.g., access should not be allowed without credential verification).

Figure 4:
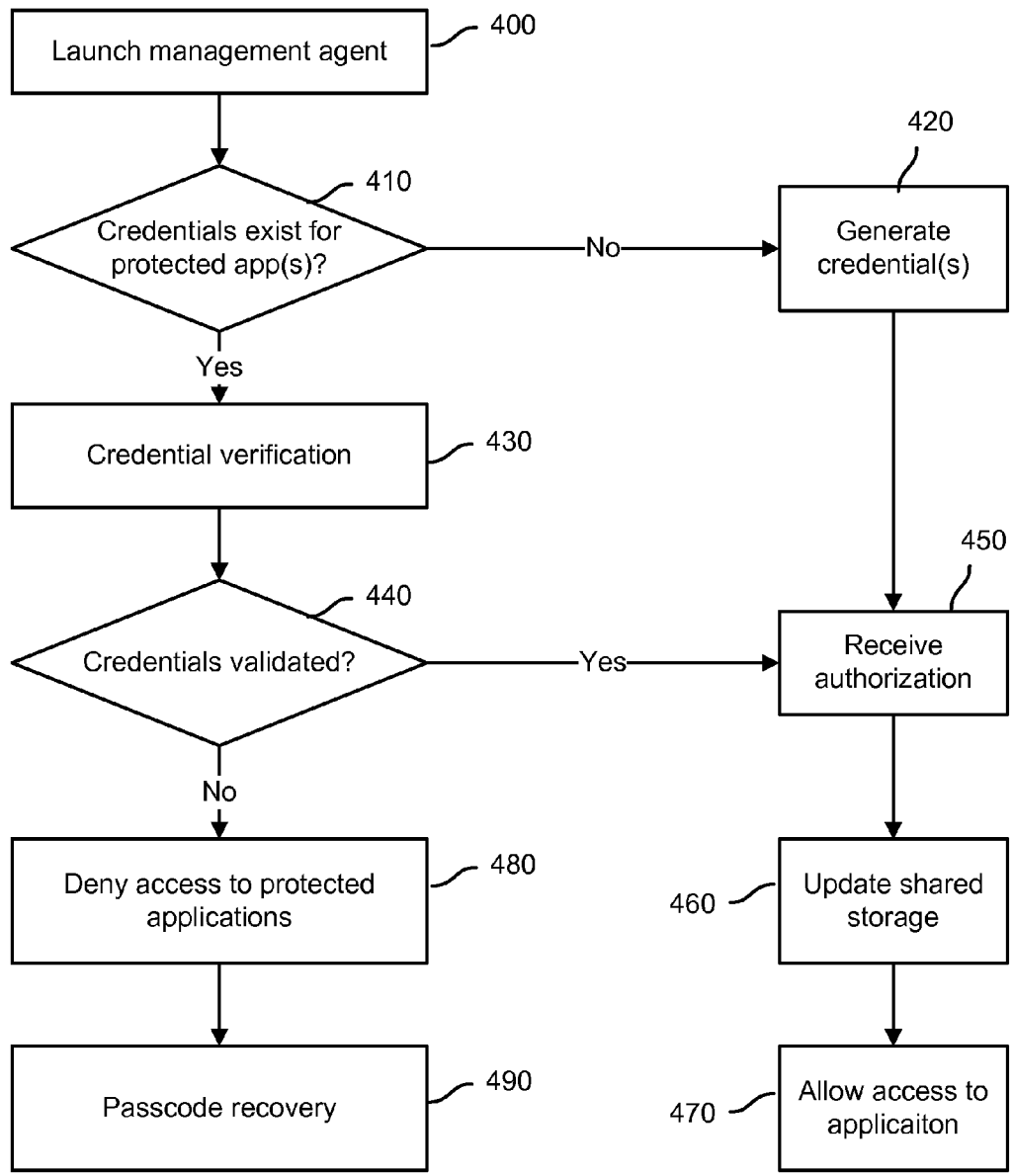
FIG. 4 is a flowchart illustrating embodiments of a process of verifying user credentials.

FIG. 4 is a flowchart illustrating embodiments of a process of verifying user credentials. In various embodiments, the process is performed by the system 100 of FIG. 1. At 400, a management agent (e.g., associated with a mobile device) may be launched. In some embodiments, it may be determined (e.g., by a library associated with a protected application) that a set of applications (e.g., an enterprise zone) including the protected application is locked (e.g., access is denied). Based at least in part on this determination, a management agent associated with the application may be launched, called, invoked, and/or otherwise initiated to execute a credential verification operation. For example, the management agent may be called using a URL scheme call associated with the management agent. The URL call may invoke the management agent and initiate the credential verification techniques.

At 410, it may be determined whether credentials exist for the set of protected applications. In some embodiments, it may be determined that the set of applications has not been previously used, and credentials (e.g., passcode(s), password(s), and/or other information) do not exist for the set of protected applications. In this case, credentials may be generated (e.g., at step 420).

In various embodiments, it may be determined that credentials exist for the set of protected applications. In some embodiments, a management agent may include a list of credentials (e.g., passcode(s), password(s), fingerprint(s), biometric data, etc.) associated with the set of applications (e.g., the enterprise zone). Based at least in part on this determination, the process may proceed to a credential verification operation (e.g., step 430).

At 420, credentials for the set of protected applications may be generated. In some embodiments, a management agent may provide (e.g., output to a user) a request for credential information. For example, a request for passcode (e.g., password, personal identification number (PIN)), fingerprint, voice sample, biometric input, and/or other credentials may be provided. A user may provide credential information (e.g., enter credential information into a dialog, provide biometric sample, etc.), and this information may be securely transferred to a security management platform for storage. In some embodiments, the credential information may be stored in an enterprise directory, security management storage location, and/or other storage location.

In various embodiments, the credential information may be associated with the set of protected information. For example, the association between the credential information and the set of applications may be stored at the security management platform, management agent, enterprise directory, and/or other location. For example, upon future credential verification operations (e.g., for a user to access the set of protected applications), a user may be required to provide credential information matching the stored credential information (e.g., stored at the security management platform).

In some embodiments, a user may be required to provide multiple sets of credential information. For example, a user may be required to provide identifying information (e.g., name, employee identification number, social security number, etc.), passcode recovery information (e.g., a passcode recovery question and answer), credential information (e.g., passcode(s), etc.), and/or other information. This information may be associated with the set of protected applications and may be used in future credential verification operations.

In various embodiments, upon storage of the credential information with the security management platform, the security management platform may provide authorization information to the management agent (e.g., as discussed in step 450 below). For example, the authorization information may include instructions authorizing the management agent to launch (e.g., allow access to) one or more application in the set of protected applications (e.g., the enterprise zone).

At 430, credentials may be verified. In some embodiments, a management agent may provide (e.g., output to a user) a request for credential information. For example, a request for credential information may include a request (e.g., dialog, output, etc.) for passcode (e.g., password, personal identification number (PIN)), fingerprint, voice sample, biometric input, and/or other credentials may be provided. A user may provide credential information (e.g., enter credential information into a dialog, provide biometric sample, etc.). The credential information may be provided in, for example, an authorization screen associated with the management agent.

In some embodiments, the credential information may be validated at a security management platform. For example, the security management platform may validate the credential information with data in an enterprise directory, a security management platform associated database, and/or other repository including credential information. In various embodiments, the credential information may be validated (e.g., by the security management platform) by comparing the credential information received from the management agent with a stored list of credential information for the set of protected applications.

In various embodiments, the security management platform may query (e.g., look up) application authorization information for the user (e.g., based on the received credentials). For example, the authorization information may include application permissions, settings, and/or other information associated with a user. Authorization information for a user may be based at least in part on the user's role in an enterprise (e.g., a higher-level employee may have more expanded permissions and/or settings than a lower-level employee). In some embodiments, the security management platform may query (e.g., look up) device status information (e.g., jailbreak status, application installation status, operating system update status), and/or other information. The application authorization information, device status information, credential information, and/or other information may be associated with a set of protected applications. For example, each set of protected application may be associated with different parameters.

At 440, it may be determined whether the credentials are valid. According to some embodiments, based at least in part on the credential information, application authorization information, device status information, and/or other parameters; the security management platform may provide authorization for a user to access the at least on application in the set of applications (e.g., enterprise zone). In the event the credential information is validated, and/or the application authorization information, device status, and/or other parameters indicate the user should be allowed access to at least one application in the set of protected applications, the process may proceed to step 450. In the event it is determined (e.g., by the security management platform) that access should not be allowed (e.g., granted) to the set of applications, the process may proceed to step 480.

At 450, authorization information may be received (e.g., by the management agent). In some embodiments, the security management platform may provide authorization information (e.g., session expiration time period(s)), authorization status information (e.g., a list of protected applications in the set of protected applications, zone lock status (e.g., unlocked), policies), and/or other information to the management agent. For example, upon validation of the credential information, application authorization information, device status information, and/or other parameters, the security management platform may be securely provide (e.g., push) the information to the management agent.

At 460, the shared storage location may be updated. In some embodiments, the management agent may update the shared storage location with authentication information, authorization information, session expiration time period(s), and/or other information. For example, the authentication information, (e.g., session expiration period(s) associated with the set of applications (e.g., the enterprise zone)), authorization information, and/or other information may be provided in an encrypted format to the shared storage location (e.g., secure application connection bus). The following is an example of information that may be provided to the shared storage location:

{authenticationExpire=1343071545, AuthorizedApps=
[{appid=company.files.Se},
{appid=company.browser.Be},
{appid=company.SFA.Ae},
{appid=company.viewer.De}], zoneLock=false}.

In some embodiments, the information may be retrieved by one or more protected applications (e.g., libraries associated with the protected applications) in the set of protected applications.

At 470, access to the application may be allowed. Based on the received authorization, the management agent may launch the application. For example, the management agent may forward the user back to the application in the set of applications (e.g., an enterprise zone application). The application may be an application that a user attempted to launch initiating the authorization operation as discussed above. In some embodiments, a library associated with the application may validate the authentication and authorization information based on the information shared in the shared storage location. In some cases, a user may be provided full access to the application and one or more other applications in the set of protected applications to which the application belongs.

At 480, access to the application may be denied. In some embodiments, the management agent may receive de-authorization (e.g., authorization denial, zone lock) information from the security management platform. For example, the credential information may not be validated/verified at the security management platform, and the security management platform may send a command to the management agent to block access to the set of applications (e.g., the enterprise zone). Based on the access restriction command, the management agent may deny access to at least one (e.g., all) application in the set of protected applications (e.g., the enterprise zone). For example, the management may deny access to the set of applications by providing commands to the shared storage location for retrieval by the libraries associated with the protected applications in the set of protected applications. In some embodiments, upon subsequent attempts (e.g., by a user) to access the application, the library may block access to the application and forward the user to the management agent for credential validation (e.g., step 400).

At 490, a credential recovery operation may be executed. In some embodiments, a request may be received for credential recovery (e.g., forgotten passcode/password recovery).

Figure 5:
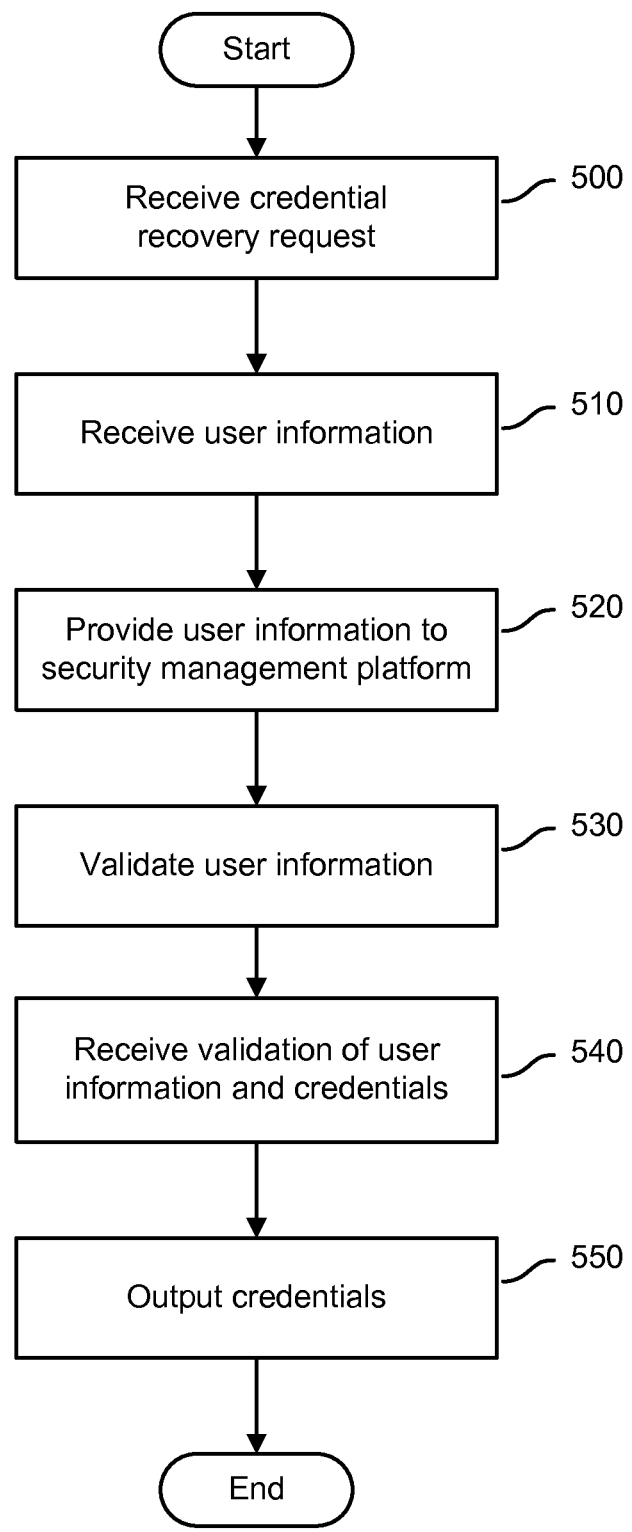
FIG. 5 is flowchart illustrating embodiments of a process of credential recovery.

FIG. 5 is flowchart illustrating embodiments of a process of credential recovery. In various embodiments, the process is performed by the system 100 of FIG. 1. At 500, a request for credential recovery (e.g., in a management agent application) may be received. For example, a user may initiate a credential recovery operation by clicking a credential recovery link (e.g., an "I forgot my password" link) in a management agent display.

At 510, user information may be received. In some embodiments, a user information request may be provided (e.g., to a user). In some embodiments, a dialog may be output (e.g., to user) requesting a user to provide user information. User information may include user credentials different from the forgotten/lost credentials including, for example, a name, username, employee identification number, password recovery questions (e.g., "what is your mother's maiden name?"), and/or other user information.

In some embodiments, the user information may be received at the management agent (e.g., associated with a set of protected applications). For example, a user may provide user information in response to the dialog as discussed above.

At 520, user information may be provided to the security management platform. In some embodiments, a management agent may securely provide (e.g., in an encrypted payload) the user information to the security management platform.

At 530, the user information may be validated. In various embodiments, the security management platform may validate the user information with an enterprise directory, a security management platform-associated database, and/or other repository including credential information. In various embodiments, the user information may validated (e.g., by the security management platform) by comparing the user information received from the management agent with a stored list of user information associated with the set of protected applications. For example, an enterprise directory may queried to validate (e.g., match) the user information against employee information in the enterprise directory.

In some embodiments, the user information may not be validated (e.g., may not match any user information records in the enterprise directory) and validation failure message may be provided to the management agent. In this case, the management agent may continue to deny access until, for example, a successful credential validation, credential recovery, and/or other actions as discussed above.

At 540, validation of the user information and credentials may be received. In some embodiments, upon validation of the user information, the security management platform may securely provide (e.g., push) credential information, validation information (e.g., information indicating that the credentials are valid), and/or other information to the management agent. For example, the security management platform may retrieve the credential information from an enterprise repository, a storage node associated with the security management platform, and/or other location.

At 550, the credentials may be output. In some embodiments, management agent may output the credentials to a user (e.g., the user that requested credential recovery). In various embodiments, the user may be directed to complete credential validation operation as discussed above (e.g., by entering the credential information (e.g., passcode) for validation).

In some embodiments, however, access to at least one application in the set of protected applications (e.g., enterprise zone) may be granted/allowed without credential verification.

Figure 6:
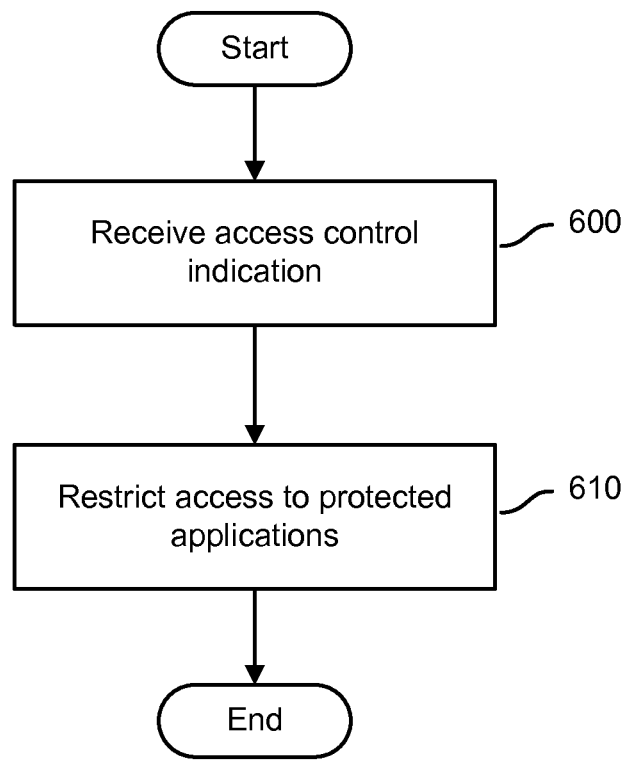
FIG. 6 is flowchart illustrating embodiments of a process of restricting access to a set of applications.

FIG. 6 is flowchart illustrating embodiments of a process of restricting access to a set of applications. In various embodiments, the process is performed by the system 100 of FIG. 1. At 600, access control indication may be received. In some embodiments, a user may provide a request to restrict access to set of applications. For example, a lock zone command associated with a set of applications may be clicked in the management agent.

At 610, access to the set of protected applications may restricted. In some embodiments, access to a set of applications may be restricted based at least in part on the access control indication. In various embodiments, the management agent may receive the access control indication (e.g., input (click) associated with a zone lock command), and based on the access control indication may provide an access restriction command (e.g., status) to the shared storage location. The following includes an example lock status which may be stored to the shared data storage location: {authenticationExpire=1343071545,AuthorizedApps= [{appid=company.files.Se}, {appid=company.browser.Be}, {appid=company.SFA.Ae}, {appid=company.viewer.De}], zoneLock=true}

In various embodiments, the access restriction command may be retrieve by a library associated with at least one application in the set of protected applications. The library may be restrict access to the application without credential verification (e.g., as discussed above in FIG. 4). For example, upon subsequent attempts to open the application, a user may be directed to the management agent for credential validation as discussed in FIG. 4.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
retrieving, from a shared storage location on a mobile device, a last activity time associated with a use of a first mobile application in a protected subset of two or more protected mobile applications, wherein a library associated with a second mobile application is configured to retrieve from the shared storage location on the mobile device the last activity time associated with the use of the first mobile application, wherein the library associated with the second mobile application is configured to modify code of the second mobile application to behave differently than an unmodified version of the code, wherein the shared storage location is accessible to the protected subset of two or more protected mobile applications and is not accessible to at least one application not in the protected subset;
determining that the last activity time is within a session expiration time period associated with the protected subset; and
allowing, by the library associated with the second mobile application, access to the second mobile application in the protected subset based at least in part on the determination.

2. The method of claim 1, further comprising:
determining that the second mobile application is associated with the protected subset of protected mobile applications.

3. The method of claim 1, further comprising writing the last activity time to the shared storage location upon an occurrence of a triggering event.

4. The method of claim 1, wherein said steps of retrieving, determining, and allowing are performed at least in part in response to a request to access the second mobile application.

5. The method of claim 1, wherein determining that the last activity time is within a session expiration time period comprises determining that a difference between a current time and the last activity time is less than the session expiration period.

6. The method of claim 1, further comprising:
receiving, at a second time after the allowed access to the one or more mobile applications, a request to access an application in the protected subset; and
determining that a difference between the second time and the last activity time is within the session expiration time period.

7. The method of claim 1, further comprising:
determining that a difference between a current time and the last activity time exceeds the session expiration time period; and
providing an indicator to a management agent associated with the protected subset of mobile applications.

8. The method of claim 7, further comprising:
outputting, by the management agent, a request for user credentials;
receiving credentials based at least in part on the request;
determining that the received credentials match a stored credential; and
allowing access to mobile applications in the protected subset based at least in part on the determined match.

9. The method of claim 8, wherein allowing access includes:
providing, to the shared storage location, authorization information and authentication information; and
launching an application in the protected subset based at least in part on a validation of the authorization information and authentication information.

10. The method of claim 7, further comprising:
outputting, by the management agent, a request for user credentials;
receiving credentials based at least in part on the request;
determining that the received credentials do not match stored credentials; and
denying access to each application in the protected subset based at least in part on the determination that the received credentials do not match stored credentials.

11. The method of claim 1, further comprising:
receiving a request to restrict access to the protected subset of the protected mobile applications; and
blocking access to the protected subset of protected mobile applications.

12. A system, comprising:
a memory or other storage device; and
a processor coupled to the memory or other storage device and configured to:
retrieve, from a shared storage location on the memory or other storage device, a last activity time associated with a use of a first mobile application in a protected subset of two or more protected mobile applications, wherein a library associated with a second mobile application is configured to retrieve from the shared storage location on the mobile device the last activity time associated with the use of the first mobile application, wherein the library associated with the second mobile application is configured to modify code of the second mobile application to behave differently than an unmodified version of the code, wherein the shared storage location is accessible to the protected subset of two or more protected mobile applications and is not accessible to at least one application not in the protected subset;

determine that the last activity time is within a session expiration time period associated with the protected subset; and allow, by the library associated with the second mobile application, access to the second mobile application in the protected subset without credential verification based at least in part on the determination.

13. The system recited in claim 12, wherein the processor is further configured to determine that the second mobile application is associated with the protected subset of protected mobile applications.

14. The system recited in claim 12, wherein the processor is further configured to determine that a difference between a current time and the last activity time exceeds the session expiration time period; and provide an indicator to a management agent associated with the protected subset of mobile applications.

15. The system recited in claim 14, wherein the processor is further configured to:

output, by the management agent, a request for user credentials;

receive credentials based at least in part on the request;

determine that the received credentials match a stored credential; and allow access to the mobile applications in the protected subset based at least in part on the determined match.

16. The system recited in claim 14, wherein the processor is further configured to:

output, by the management agent, a request for user credentials;

receive credentials based at least in part on the request;

determine that the received credentials do not match stored credentials; and deny access to each application in the protected subset based at least in part on the determination that the received credentials do not match stored credentials.

17. A computer program product, the computer program product being embodied in a tangible non-transitory computer readable storage medium and comprising computer instructions, which when executed cause a computer to perform steps of:

retrieving, from a shared storage location on a mobile device, a last activity time associated with a use of a first mobile application in a protected subset of two or more protected mobile applications, wherein a library associated with a second mobile application is configured to retrieve from the shared storage location on the mobile device the last activity time associated with the use of the first mobile application, wherein the library associated with the second mobile application is configured to modify code of the second mobile application to behave differently than an unmodified version of the code, wherein the shared storage location is accessible to the protected subset of two or more protected mobile applications and is not accessible to at least one application not in the protected subset;

determining that the last activity time is within a session expiration time period associated with the protected subset; and allowing, by the library associated with the second mobile application, access to the second mobile application in the protected subset based at least in part on the determination.

18. The computer program product recited in claim 17, further comprising computer instructions for:

determining that a difference between a current time and the last activity time exceeds the session expiration time period; and providing an indicator to a management agent associated with the protected subset of mobile applications.

19. The computer program product recited in claim 17, further comprising computer instructions for:

receiving, at a time after the allowed access, a request to access an application in the protected subset; and determining that a difference between the access time and the last activity time is within the session expiration time period.

20. The computer program product recited in claim 17, wherein determining that the last activity time is within a session expiration time period comprises determining that a difference between a current time and the last activity time is less than the session expiration period.

* * * * *